(12) United States Patent
Wu et al.

(10) Patent No.: US 6,732,267 B1
(45) Date of Patent: May 4, 2004

(54) SYSTEM AND METHOD FOR PERFORMING REMOTE BIOS UPDATES

(75) Inventors: Frank L. Wu, Austin, TX (US); Anil Rao, Austin, TX (US); Armando Jaime Martinez, Austin, TX (US); Roger M. Blood, Austin, TX (US)

(73) Assignee: Dell Products L.P., Round Rock, TX (US)

(*) Notice: Subject to any disclaimer, the term of this patent is extended or adjusted under 35 U.S.C. 154(b) by 553 days.

(21) Appl. No.: 09/658,981

(22) Filed: Sep. 11, 2000

(51) Int. Cl.[7] .................................... G06F 15/177
(52) U.S. Cl. ................................ 713/100; 713/2
(58) Field of Search .................... 713/1, 2, 100

(56) References Cited

U.S. PATENT DOCUMENTS

| | | | |
|---|---|---|---|
| 5,388,267 A | 2/1995 | Chan et al. ............... 395/700 |
| 5,579,522 A * | 11/1996 | Christeson et al. ........... 713/2 |
| 5,826,015 A * | 10/1998 | Schmidt .................. 713/201 |
| 5,835,761 A | 11/1998 | Ishii et al. ............... 395/653 |
| 5,930,504 A * | 7/1999 | Gabel ...................... 713/2 |
| 5,964,873 A | 10/1999 | Choi ....................... 713/2 |
| 6,018,806 A | 1/2000 | Cortopassi et al. .......... 714/8 |
| 6,282,643 B1 * | 8/2001 | Cromer et al. .............. 713/2 |
| 6,317,828 B1 | 11/2001 | Nunn ....................... 713/2 |
| 6,385,623 B1 | 5/2002 | Smith et al. ............. 707/200 |
| 6,438,688 B1 * | 8/2002 | Nunn ....................... 713/2 |
| 6,510,512 B1 | 1/2003 | Alexander .................. 713/2 |

FOREIGN PATENT DOCUMENTS

| | | |
|---|---|---|
| DE | 19525105 | 1/1996 |
| JP | 10083309 | 3/1998 |

OTHER PUBLICATIONS

Extensible Firmware Specification, Version 0.99—Table of Contents; Section 1—Introduction; Section 2—Overview; Section 16—File System Format; Section 17—Boot Manager, Apr. 19, 2000.

* cited by examiner

*Primary Examiner*—Dennis M. Butler
(74) *Attorney, Agent, or Firm*—Baker Botts L.L.P.

(57) ABSTRACT

A system and method for remotely updating a system BIOS. The method includes the steps of providing an updated BIOS to the remote computer system, storing the updated BIOS in a storage device of the remote computer system, setting a BIOS update indicator, rebooting the remote computer system and determining that the BIOS update indicator has been set, replacing the system BIOS with the updated BIOS, and rebooting the remote computer system again. The storage device may be hard drive, with the updated BIOS being stored in an EFI partition of the hard drive.

8 Claims, 2 Drawing Sheets

SYSTEM AND METHOD FOR PERFORMING REMOTE BIOS UPDATES

TECHNICAL FIELD

The system and method described herein relates generally to the field of computer systems, and more particularly, to updating a BIOS on a remote computer system.

BACKGROUND

A personal computer system typically includes a system unit having a central processing unit (CPU) and associated memory, and a storage device such as a hard disk, floppy disk or CD ROM, a display device, and an input device such as a keyboard or mouse. When a computer system is powered on, or "booted," the computer must ensure that all computer components are functional, and subsequently load the operating system. These functions are performed by code referred to as the Basic Input/Output System (the system BIOS). The BIOS also contains data and instructions that enable the operating system to access system hardware. The system BIOS is stored in system memory, typically in non-volatile memory such as flash memory. During booting, the system BIOS first performs a Power On Self Test (POST), then proceeds to load the operating system. Following successful loading of the operating system, the user will be able to take advantage of all features and functionality offered by or through the operating system.

There are many occasions on which it is desirable to update the system BIOS. For example, the system BIOS must be updated to take advantage of new BIOS features that become available, or to enable the BIOS to support new system hardware. Updating is also necessary if problems with the system BIOS are detected.

Often, it is also desirable to remotely update the system BIOS. For example, for computer systems on a network it is more convenient and time efficient to update the BIOS of remote systems on the network from a single separately located system, such as from a system administrator. Currently, this can be accomplished in remote computer systems that are capable of executing a "soft" reboot rather than a full reboot such as that which occurs when the computer system is powered on. During a soft reboot the contents of system memory are maintained throughout the soft reboot procedure. For example, computers supporting an Intel IA-32 architecture are capable of executing a soft reboot. The updated BIOS image is sent through a network to the target computer system and placed in system memory as described above. Once in system memory, a flag in the CMOS is set (the RBU flag or "Request BIOS Update") flag, and the system is subsequently directed by the system management agent to execute a soft reboot. When rebooting, the system BIOS determines that the RBU flag is set, and proceeds to replace the system BIOS with the updated system BIOS that is stored in system memory. The RBU flag is then reset, and the system rebooted again to run the updated BIOS. It also may be advantageous for the system BIOS to place a completion status message in the System Management portion of the BIOS (SMBIOS) or the equivalent. On rebooting, the system BIOS will check the completion status to ensure that the update was completed successfully. Although advantageous, the completion status message is also problematic because it requires accessing the system BIOS during the booting procedure, which requires additional BIOS interface code. Further, many future systems will not include an SMBIOS portion.

The above method for remotely updating a system BIOS is possible only in computer systems capable of executing a soft reboot where the contents of the system memory are maintained throughout the soft reboot. This feature, however, does not exist for many newer computer systems, including computer systems that are based on Intel IA-64 architecture. In these systems, no soft reboot is available and the contents of the system memory are lost during a system reboot.

SUMMARY OF THE PREFERRED EMBODIMENTS

Accordingly, need exists for a new system and method for remotely updating a system BIOS for these types of computer systems.

A further need exists for providing such a system and method that is not platform specific.

A method for remotely updating a system BIOS of a computer system is provided including the steps of providing an updated BIOS to the computer system, storing the updated BIOS in a predetermined partition in a writable non-volatile storage device in the computer system, setting a BIOS update indicator, and rebooting the computer system. During the rebooting step the computer system determines that the BIOS update indicator has been set. The method further includes the steps of replacing the system BIOS with the updated BIOS, and rebooting the computer system.

According to one embodiment, the method further includes the step of, after the replacing step, resetting the BIOS update indicator. In yet another embodiment, the method further includes the steps of, prior to the replacing step, retrieving the updated BIOS from the predetermined partition in the storage device, and validating the updated BIOS.

In yet another embodiment, the method further includes the steps of, following the setting step, the step of placing a storage location identifier in the predetermined partition of the storage device identifying the location of the updated BIOS. In yet another embodiment the in the retrieving step the updated BIOS is located using the storage location identifier.

According to another embodiment, the computer system is part of a network, and a centralized computer system on the network is coupled to the computer system by a communication link, and the centralized computer system provides the updated BIOS to the computer system via the communication link.

In another embodiment, the updated BIOS is stored in an EFI partition of the storage device, and in yet another embodiment, the BIOS update indicator is a bit located in the EFI NVRAM.

A computer system is also provided wherein the computer system is a network, and is coupled to at least one centralized computer system in said network via a communication link. The computer system includes a central processing unit, a system BIOS, and a writable non-volatile storage device. The computer system is capable of receiving an updated BIOS image from the centralized computer system via the communication link, storing the updated BIOS image in a partition of the storage device, rebooting the computer system, and subsequently replacing the system BIOS with the updated BIOS and rebooting.

According to one embodiment, the computer system is further capable of setting a BIOS update indicator to indicate a BIOS update request after the updated BIOS has been stored in the partition of the storage device, determining whether the BIOS update indicator has been set during rebooting, and replacing the system BIOS with the updated BIOS if it is determined that the BIOS update indicator has been set.

According to yet another embodiment, before the computer system replaces the updated BIOS, it is further capable of retrieving the updated BIOS from the partition of the storage device, and validating the updated BIOS.

In yet another embodiment, the updated BIOS image is stored in an EFI partition of the storage device, and wherein the BIOS update indicator is a bit located in the EFI NVRAM.

BRIEF DESCRIPTION OF THE DRAWINGS

A more complete understanding of the disclosed embodiments and advantages thereof may be acquired by referring to the following description taken in conjunction with the accompanying drawings in which like reference numbers indicate like features, and wherein.

DETAILED DESCRIPTION

Figure 1:
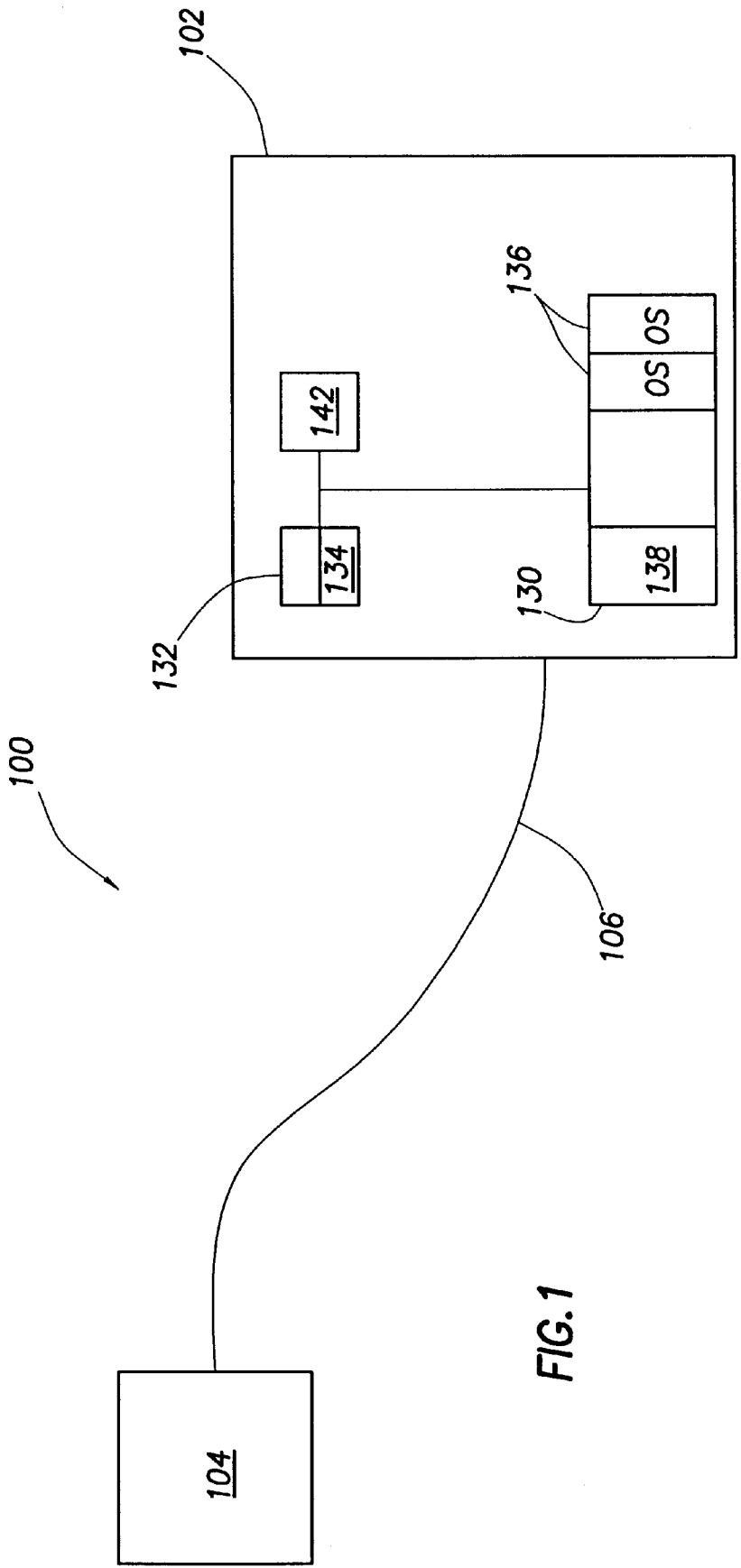
FIG. 1 is an ion of a typical computer system in a network.

FIG. 1 illustrates a computer network 100 having a remote or target computer system 102, and another computer system, such as a system administrator 104, coupled together by communication link 106. Target system 102 includes a central processing unit (CPU) 132 containing the system BIOS 134 in non-volatile memory such as flash memory. The computer system 102 also includes system memory 142 associated with the CPU, which typically consists of random access memory (RAM), and one or more writable non-volatile storage devices 130, such as a hard disk drive. Among many other things, the storage device 130 contains one or more operating systems 136 and a partition 138 dedicated to storing code and instructions for providing an interface between the operating system(s) and firmware. This interface enables the operating system to successfully complete the booting process. According to one embodiment, remote system 102 follows Intel IA-64 architecture, and partition 138 is an Extensible Firmware Interface (EFI) partition. The EFI partition is dedicated to the booting environment, and stores, for example operating system loaders. As will be described more fully below, the EFI partition may also be used according to one embodiment to store code and files supporting remote BIOS updating.

Figure 2:
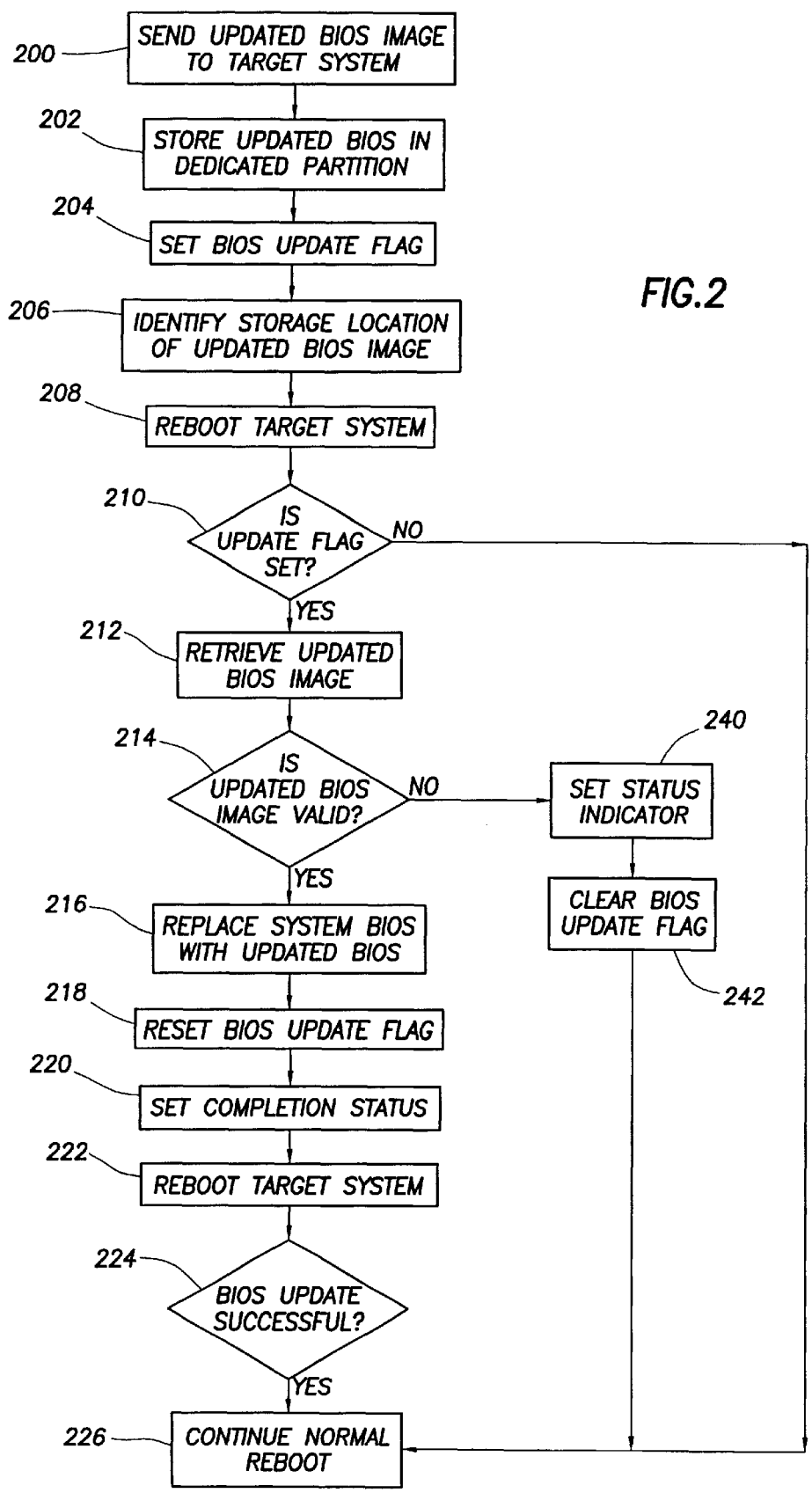
FIG. 2 is a flow chart illustrating a method for remotely updating the system BIOS.

A method by which the system BIOS of a target system may be remotely updated will now be described in detail with reference to FIG. 2. An updated BIOS image is first sent from another computer system on the network 104 (i.e., the system administrator) to the target system at step 200. Typically, both the system administrator and the remote system will include software for performing such updating functions. For example, the system administrator and the target system may include Dell Computer Corporation's Open Manager Software. The system administrator sends the updated BIOS image 124 over communication link 106 to the target system. The updated BIOS image is received by an operating system module, such as the system management agent, and loaded into a predetermined location in the dedicated partition 138 of storage device 130, such as the EFI partition, at step 202. This predetermined location may be any directory previously established for the purpose of remote BIOS updating, such as a utility directory or the like. At step 204, the system management agent sets a BIOS update indicator to indicate a BIOS update request. This BIOS update indicator may be any suitable bit or flag that will be examined by the system BIOS during booting. In IA-64 based systems, several flags are set aside in the EFI NVRAM for use by programmers, and one of these bits may be used to indicate the desired BIOS update.

In addition to setting a flag in the EFI NVRAM, according to one embodiment, the operating system also identifies the specific file name and path at which the updated BIOS image is located within the EFI NVRAM so that it may later be retrieved. This information is also placed in the EFI NVRAM at step 206.

Next, at step 208, the system management agent directs the target system to reboot. This is accomplished for example by issuing a system reset command. On rebooting, the system BIOS will examine the BIOS update indicator, in this embodiment the designated EFI NVRAM bit or flag to determine whether it has been set at step 210. If the flag has not been set, the system will proceed with a normal reboot (step 226). If, however, the flag has been set, the system BIOS will retrieve the updated BIOS image from the designated partition (step 212) by using the file name and path placed in the EFI NVRAM. At step 214, the BIOS will examine the updated BIOS image to determine whether it is valid by executing any suitable "checksum" procedure, and if so, will proceed to replace the old system BIOS with the updated system BIOS image (step 216) by writing over the old system BIOS with the updated BIOS image.

If the BIOS determines that the updated BIOS image is not valid, the BIOS will set a status indicator in the dedicated partition (i.e., EFI NVRAM) indicating this, and will then proceed to clear the BIOS update indicator to ensure that the BIOS does not again later attempt to replace the system BIOS with the faulty updated BIOS image. Once the system BIOS has been replaced with the updated BIOS image, the BIOS will reset the BIOS update indicator (i.e., the EFI NVRAM flag) at step 218. In addition, the BIOS will place a completion status indicator (step 220) in the dedicated partition and subsequently initiate another reboot at step 222. The completion status indicator can be a status and time stamp placed in the EFI NVRAM. It is examined during the subsequent reboot to determine whether BIOS updating has been successfully completed (step 224). Placing the status completion indicator in the EFI NVRAM rather than the system SMBIOS avoids the necessity for additional BIOS interface code such was requested for prior art systems and methods. If BIOS updating was successfully completed, the target system will proceed with the normal reboot process at step 226. If not, BIOS updating procedures will cease, and the system will execute a normal system reboot.

The system and method described above enables remote BIOS updating of computers that do not support a soft reboot, and in particular of IA-64 based computer systems. The system and method is further advantageous in that it does not require any BIOS specific code to support it, and therefore, can be implemented in the same manner for many computer systems having different firmware.

Although the present invention has been described in detail, it should be understood that various changes, substitutions and alterations can be made hereto without departing from the spirit and scope of the invention as defined by the appended claims.

What is claimed is:

1. A method for remotely updating a system BIOS of a computer system comprising the steps of:
   providing an updated BIOS to said computer system;
   storing said updated BIOS in a predetermined partition in a writable non-volatile storage device in said computer system;
   setting a BIOS update indicator;
   placing a storage location identifier in said predetermined partition of said storage device identifying the location of said updated BIOS;
   rebooting said computer system, during said rebooting step said computer system determining that said BIOS update indicator has been set;
   retrieving said updated BIOS from said predetermined partition in said storage device;
   replacing said system BIOS with said updated BIOS; and
   rebooting said computer system.

2. The method according to claim 1, wherein in said retrieving step said updated BIOS is located using said storage location identifier.

3. The method according to claim 2, wherein said computer system is part of a network, and wherein a centralized computer system on said network is coupled to said computer system by a communication link, and wherein said centralized computer system provides said updated BIOS to said computer system via said communication link.

4. The method according to claim 3, wherein said updated BIOS is stored in an Extensible Firmware Interface partition of said storage device.

5. The method according to claim 4, wherein said BIOS update indicator is a bit located in said Extensible Firmware Interface partition of said storage device.

6. The method according to claim 5, wherein said system BIOS is stored in non-volatile flash memory in said computer system.

7. A computer system in a network, said computer system being coupled to at least one centralized computer system in said network via a communication link, said computer system comprising:
   a central processing unit;
   a system BIOS; and
   a writable non-volatile storage device;
   said computer system being capable of receiving an updated BIOS image from said centralized computer system via said communication link, storing said updated BIOS image in a partition of said storage device, placing a storage location identifier in said partition to identify the location of said updated BIOS image, rebooting said computer system, and subsequently replacing said system BIOS with said updated BIOS and rebooting.

8. A method for remotely updating a system BIOS of a computer system comprising the steps of:
   sending an updated BIOS image to said computer system via a communication link coupled to said computer system;
   storing an updated BIOS image in a predetermined partition of a writable non-volatile storage device in said computer system;
   placing a storage locating identifier in said predetermined partition of said storage device to identify the location of said updated BIOS image;
   rebooting said computer system; and
   replacing said system BIOS with said updated BIOS.

* * * * *